United States Patent
Jacquemard et al.

(10) Patent No.: US 12,371,995 B2
(45) Date of Patent: Jul. 29, 2025

(54) AIRCRAFT TURBINE ENGINE DRIVE LINE SHAFT COMPRISING A CONNECTING RING FOR DISASSEMBLING THE DRIVE LINE

(71) Applicant: SAFRAN AIRCRAFT ENGINES, Paris (FR)

(72) Inventors: Christophe Paul Jacquemard, Moissy-Cramayel (FR); Xavier Jean Yves Alain Agneray, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 154 days.

(21) Appl. No.: 18/252,119

(22) PCT Filed: Nov. 8, 2021

(86) PCT No.: PCT/EP2021/080918
§ 371 (c)(1),
(2) Date: May 8, 2023

(87) PCT Pub. No.: WO2022/106237
PCT Pub. Date: May 27, 2022

(65) Prior Publication Data
US 2024/0003258 A1   Jan. 4, 2024

(30) Foreign Application Priority Data

Nov. 17, 2020   (FR) .................................. 2011801

(51) Int. Cl.
*F01D 5/02* (2006.01)
*F02C 7/36* (2006.01)
*F16C 3/02* (2006.01)

(52) U.S. Cl.
CPC ................ *F01D 5/026* (2013.01); *F02C 7/36* (2013.01); *F05D 2240/60* (2013.01);
(Continued)

(58) Field of Classification Search
CPC ........... F01D 5/026; F05D 2240/60–61; F05D 2230/60; F05D 2230/70; F04D 29/04;
(Continued)

(56) References Cited

U.S. PATENT DOCUMENTS

| 3,631,688 A | 1/1972 | Quick |
| 4,185,937 A | 1/1980 | Anderson |

FOREIGN PATENT DOCUMENTS

| EP | 1498624 A1 * | 1/2005 | ............. F01D 25/16 |
| FR | 2633023 A1 | 12/1989 | |

OTHER PUBLICATIONS

Search Report from the French Intellectual Property Office on corresponding FR application (FR2011801) dated Jul. 9, 2021.
(Continued)

*Primary Examiner* — Stephanie Sebasco Cheng
(74) *Attorney, Agent, or Firm* — Alumen IP Law PC (57) ABSTRACT

Disclosed is a main shaft for an aircraft turbine engine drive line extending longitudinally from front to rear along an axis and having a rear portion configured for receiving a front portion of a rear shaft by interlocking, the main shaft having:
—a front retaining member and a rear retaining member together defining a prison and each having a central opening,
—a connecting ring, located in the prison, having a rear end configured to be screwed to a front end of the rear shaft extending into the central opening of the rear retaining member, the connecting ring having a gripping member formed on the inner surface and accessible from a front portion of the main shaft by a tool extending via the central opening of the front retaining member.

15 Claims, 7 Drawing Sheets

(52) U.S. Cl.
CPC .......... *F05D 2260/31* (2013.01); *F16C 3/023* (2013.01); *F16C 2360/23* (2013.01)

(58) Field of Classification Search
CPC .. F04D 29/0405; F04D 29/043; F04D 29/044; F04D 29/05; F04D 29/053; F04D 29/054; F16D 1/02; F16D 2001/062; F16C 3/023; F16C 3/12; F16C 2226/16; F16C 2226/60; F16C 2226/70; F16C 2226/72; F16C 2360/23; Y10T 403/7077; Y10T 403/7083; Y10T 403/7084; Y10T 403/7086

See application file for complete search history.

(56) References Cited

OTHER PUBLICATIONS

International Search Report and Written Opinion on corresponding PCT application (PCT/EP2021/080918) from International Searching Authority (EPO) dated Feb. 10, 2022.

\* cited by examiner

AIRCRAFT TURBINE ENGINE DRIVE LINE SHAFT COMPRISING A CONNECTING RING FOR DISASSEMBLING THE DRIVE LINE

TECHNICAL FIELD

The present invention relates to the field of aircraft turbine engines and more particularly relates to a drive line shaft comprising a connecting ring to facilitate disassembling the drive line.

BACKGROUND

Figure 1:
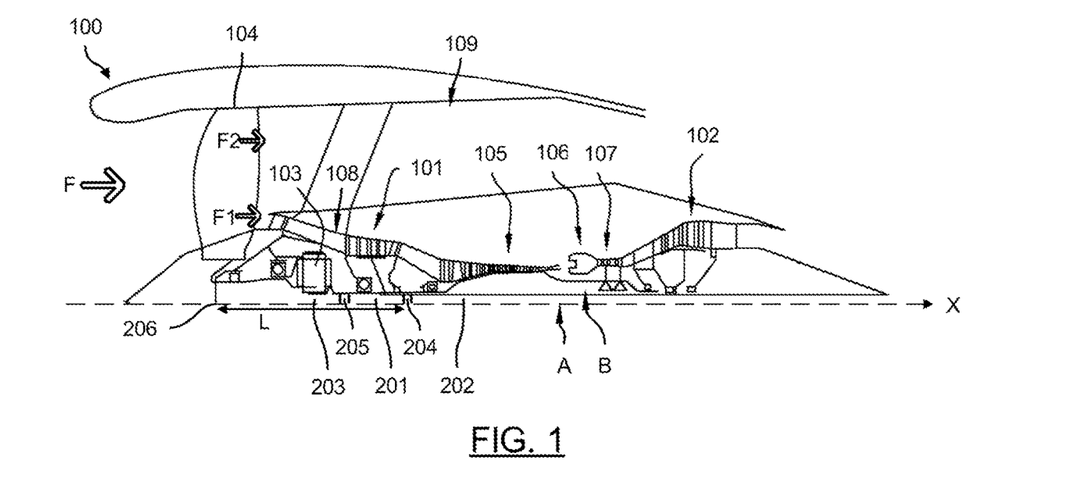
FIG. 1 is a schematic representation in a longitudinal half-section of an aircraft bypass turbine engine with a low-pressure drive line according to the prior art.

In a known manner, in reference to FIG. 1, an aircraft bypass turbojet engine 100 is shown extending longitudinally along an axis X oriented from upstream to downstream and configured to allow propulsion of the aircraft from the acceleration of an air flow F circulating from upstream to downstream in the turbojet 100. Subsequently, the terms "upstream" and "downstream" are defined with respect to the orientation of the longitudinal axis X. The terms "inside" and "outside" in turn are defined along the radial direction with respect to the longitudinal axis X.

As shown in FIG. 1, the aircraft bypass turbojet 100 comprises a radially inner primary duct 108 and a radially outer secondary duct 109 wherein respectively circulate a first part and a second part of the air flow F, known as the primary air flow F1 and the secondary air flow F2. Furthermore, the turbojet 100 comprises from upstream to downstream, an air inlet comprising a fan 104 for accelerating the air flow F, low-pressure 101 and high-pressure 105 compressors for accelerating the primary air flow F1, a combustion chamber 106 of gas with the primary air flow F1, and high-pressure 107 and low-pressure 102 turbines. The high-pressure turbine 107 makes it possible to drive the high-pressure compressor 105 in rotation while the low-pressure turbine 102 makes it possible to drive the low-pressure compressor 101 in rotation and the fan 104. In this example, the turbojet 100 further comprises a reduction gearbox 103 connected to the fan 104 and configured to reduce the rotation speed transmitted by the low-pressure turbine 102 to the fan 104.

More precisely, still in reference to FIG. 1, the turbojet 100 comprises a low-pressure drive line A connecting the reduction gearbox 103, the low-pressure compressor 101 and the low-pressure turbine 102 as well as a high-pressure drive line B connecting the high-pressure compressor 105 and the high-pressure turbine 107. The low-pressure A and high-pressure B drive lines extend coaxially along the longitudinal axis X, with the low-pressure drive line A extending radially inwards to the high-pressure drive line B.

Still in reference to FIG. 1, the low-pressure drive line A comprises from upstream to downstream a reduction gearbox shaft 203, a compressor shaft 201 and a turbine shaft 202, in the form of coaxial hollow parts of longitudinal axis X and on which the reduction gearbox 103, the low-pressure compressor 101 and the low-pressure turbine 102 are mounted respectively. The low-pressure drive line A also comprises connecting rings 204, 205 for butt joining the shafts 203, 201, 202 as well as anti-rotation rings and axial stop segments (not shown) to secure the assembly.

In practice, maintenance operations must be regularly carried out on the turbojet 100, and in particular on the low-pressure turbine 102, which require disassembly of the turbine shaft 202 of the low-pressure drive line A, i.e. disassembly of the connecting ring 204 connecting the compressor shaft 201 and the turbine shaft 202. However, such a connecting ring 204 is not accessible directly from the outside, as it is located at a distance L of more than one meter downstream from the upstream end 206 of the low-pressure drive line A. Such a maintenance operation therefore requires complete disassembling then reassembly of the low-pressure drive line A, which is time-consuming.

Figure 2:
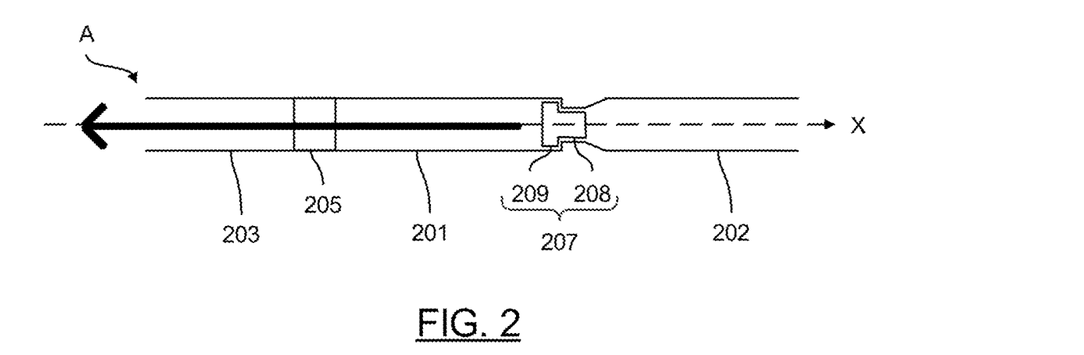
FIG. 2 is a functional schematic representation in longitudinal section of the low-pressure drive line of FIG. 1 with a connecting ring of the compressor shaft and the turbine shaft inserted upstream according to the prior art.

To resolve this disadvantage, as shown in FIG. 2, it is known by patent application FR3018313A1 a connecting ring 207 which is inserted by the upstream end 206 of the low-pressure drive line A in the reduction gearbox shaft 203 and the compressor shaft 201. Such a connecting ring 207 comprises a downstream end 208 configured to be screwed with the turbine shaft 202 and an upstream end 209 configured to axially abut against the end of the compressor shaft 201. Advantageously, during a maintenance operation, such a connecting ring 207 may be advantageously unscrewed and removed from the upstream end 206 of the low-pressure drive line A, then reinserted and screwed in analogously. This eliminates the need to disassemble then reassemble the entire low-pressure drive line A.

It is also known by patent application U.S. Pat. No. 4,185,937A1 a fastening device comprising a head portion mounted against a front shaft, a threaded portion cooperating with a rear shaft, and a deformable ring comprising at rest an anti-rotation ellipsoidal section. To disconnect the shafts, the fastening device comprises a housing with which a tool inserted via the front shaft may cooperate. The passage of the tool deforms the ring, allowing rotation and allowing the fastening device to be removed.

Figure 3:
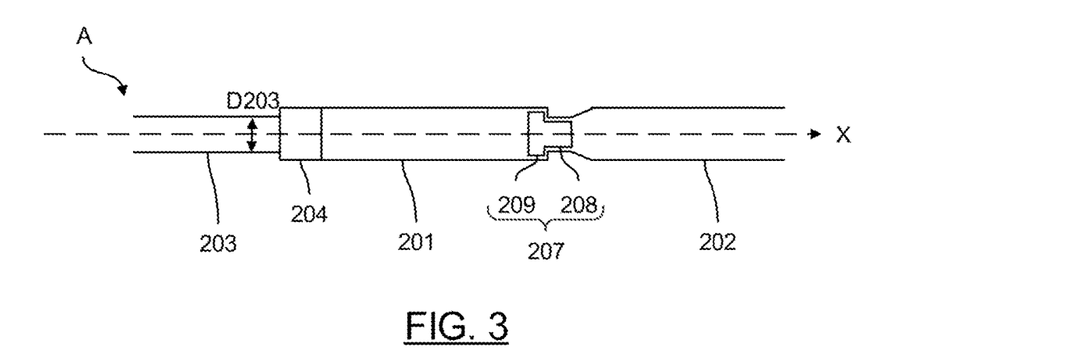
FIG. 3 is a functional schematic representation in longitudinal section of the low-pressure drive line of FIG. 2 with a reduced diameter reduction gearbox shaft according to the prior art.

In fact, as shown in FIG. 3, it is desirable to reduce the diameter D203 of the reducer shaft 203 in order to reduce the radial size of the reduction gearbox 103, in particular for aircraft turbine engines 100 comprising a variable-pitch fan 104 or an unenclosed fan 104 which have a substantial diameter. Such a reduced diameter D203 reduction gearbox shaft 203 has the disadvantage of being too narrow to allow passage of the connecting 207 during a maintenance operation. An immediate solution to overcome this disadvantage would be to not pass through the inside of the low-pressure drive line A, but outside of the latter. However, such a solution is complex to implement in the congested environment of the aircraft turbojet 100.

The invention thus aims to be able to easily and conveniently disassemble the compressor shaft 201 and the turbine shaft 202 of the low-pressure drive line A during a maintenance operation, in particular in the case of a reduction gearbox shaft 203 with a reduced diameter. The invention further generally aims to be able to easily and conveniently disassemble a shaft of an aircraft turbine engine drive line.

SUMMARY

The invention relates to a main shaft of an aircraft turbine engine drive line configured to be integrally connected to a rear shaft of the drive line, said main shaft extending longitudinally from front to rear along an axis and having the form of a hollow part defining an open inner cavity, said main shaft comprising a rear portion configured for receiving a front portion of the rear shaft by interlocking.

The invention is remarkable in that the main shaft comprises:
  at least one front retaining member and at least one rear retaining member positioned in the inner cavity so as to define together a prison and each comprising a central opening, the front portion of the rear shaft comprising a front end configured to extend into the central opening of the rear retaining member, and a connecting ring located in the prison and comprising a rear end configured to be screwed to the front end of the rear shaft and to abut against the rear retaining member, said connecting ring comprising an inner surface on which at least one gripping member is formed accessible from a front portion of the main shaft by a tool extending via the central opening of the front retaining member, to allow the connecting ring to be driven in rotation about the longitudinal axis to screw it to the rear shaft, so as to integrally connect the main shaft to the rear shaft.

Thanks to the invention, the main shaft and the rear shaft of a drive line may be disassembled in a simple and convenient way, using only a tool inserted into the inner cavity of the main shaft by the front portion. Thus, even if the inner access diameter is reduced, disassembly is possible as the connecting ring remains captive and must not be extracted. In addition, such a captive assembly makes it possible to use a connecting ring the diameter of which is sufficient to take up the loads of the rear shaft, in particular, when the latter has the form of a turbine shaft.

The connecting ring of the main shaft and of the rear shaft extends indeed into the inner cavity of the main shaft, which only requires access at the front to handle it and does not result in any external encumbrance of the drive line. In addition, the connecting ring is captively mounted in the main shaft, which eliminates the need to extract it in a potentially restricted and complex space, such as a front shaft with a small diameter, or the need to disassemble the front shaft, if any. The connecting ring is furthermore easy to handle thanks to the gripping member formed on its inner surface, easily accessible from the front by means of tools. The invention is thus particularly suitable for an aircraft turbine engine representing a loaded and complex environment, where regular maintenance of parts, such as shafts, is necessary.

According to one aspect of the invention, the connecting ring is axially movably mounted in the prison between a connecting position and a stand-by position. Advantageously, such a movable connecting ring facilitates the attaching and detaching of the main shaft and the rear shaft. Preferably, in the connecting position, the rear end of the connecting ring extends abutting against the rear retaining member and is configured to cooperate by screwing with the front end of the front portion of the rear shaft, in order to integrally connect the main shaft to the rear shaft. Preferably, in the stand-by position, the rear end of the connecting ring extends freely away from the rear retaining member, in order to favor the extraction of the rear shaft.

According to a preferred aspect, the rear end of the connecting ring comprises a tapped inner surface configured to cooperate by screwing with a threaded outer surface of the front end of the rear shaft. This thus makes it easy to center the connecting ring and the rear shaft to screw them.

Preferably, the rear end of the connecting ring comprises an outer diameter greater than the diameter of the central opening of the rear retaining member, in order to allow the abutment of the connecting ring against the rear retaining member. Preferably, the connecting ring comprises a front end comprising an outer diameter greater than the diameter of the central opening of the front retaining member. Such front and rear retaining members advantageously prevent the connecting ring from coming out of the prison.

According to one aspect of the invention, the gripping member of the connecting ring comprises an inner diameter less than the inner diameter of the rear end of said connecting ring. Preferably, the gripping member of the connecting ring comprises an inner diameter less than the inner diameter of the front end of said connecting ring. Such a gripping member is advantageously configured to cooperate with a tooling of restricted diameter that may thus easily be inserted through the front portion of the main shaft.

Preferably, the gripping member comprises a plurality of splines, allowing the tooling to easily screw the connecting ring to the rear shaft, in particular without relative rotation between the connecting ring and the tooling.

According to one aspect of the invention, the rear retaining member is made of material from the main shaft and thus has optimum rigidity in order to withstand the tightening torque of the connecting ring. Preferably, the rear retaining member has the form of an inner radial protruding portion extending from the inner surface of the main shaft.

According to another preferred aspect, the front retaining member is mounted relative to the inner cavity of the main shaft, in order to allow the connecting ring to be inserted into the prison during the mounting of the main shaft.

According to one aspect of the invention, the front retaining member is configured to cooperate with a front end of the connecting ring and with the inner surface of the main shaft so as to hold the connecting ring fixed with respect to the main shaft. Such a front retaining member advantageously has two functions, namely to delimit at the front the prison and to block the movement of the connecting ring when the latter is not screwed.

According to one aspect, the front retaining member is axially movably mounted in the inner cavity of the main shaft between a front position and a rear position. Preferably, in the rear position, the front retaining member holds the connecting ring fixed in the connecting position with respect to the main shaft, in order to secure the attachment of the main shaft and the rear shaft. This thus prevents any unintentional loosening of the connecting ring. Preferably, in the front position, the front retaining member holds the connecting ring fixed in the stand-by position with respect to the main shaft, in order to prevent the connecting ring from moving by itself in the prison.

According to a preferred aspect, the front retaining member comprises a rotational locking element configured to cooperate with the front end of the connecting ring and with the inner surface of the main shaft to prevent rotation with respect to the longitudinal axis of the connecting ring relative to the main shaft.

According to a preferred aspect, the front retaining member comprises an axial locking element configured to cooperate with the front end of the connecting ring and with the inner surface of the main shaft to prevent translation with respect to the longitudinal axis of the connecting ring relative to the main shaft.

According to another preferred aspect, the front end of the connecting ring is configured to be screwed with the rear end of a connecting member configured to extend into the central opening of the front retaining member. Such a connecting ring advantageously makes it possible to connect the main shaft on the one hand to the rear shaft and on the other hand to a front shaft.

According to a preferred aspect, the main shaft is configured to be integrally connected to a front shaft of the drive line, the front portion of the main shaft being configured to receive a rear portion of the front shaft by interlocking. The connecting ring advantageously allows the main shaft and the rear shaft to be attached and detached in the presence of a front shaft integrally connected to the main shaft.

According to another preferred aspect, the rear portion of the main shaft comprises a power transmission member configured to cooperate with a power transmission member of the front portion of the rear shaft. Preferably, the front portion of the main shaft comprises a power transmission member configured to cooperate with a power transmission member of the rear portion of the front shaft. Preferably, the power transmission member of the front portion and/or the rear portion of the main shaft has the form of splines formed on the inner surface of the main shaft. Such a power transmission member favors cooperation between the main shaft and the rear shaft/front shaft.

The invention also relates to an aircraft turbine engine drive line comprising a main shaft as described previously and a rear shaft integrally connected, said rear shaft extending longitudinally from front to rear along the axis and has the form of a hollow part, said rear shaft comprising a front portion interlocked in the rear portion of said main shaft, said front portion of the rear shaft comprising a front end extending into the central opening of the rear retaining member and cooperating by screwing with the rear end of the connecting ring.

Preferably, the front end of the rear shaft comprises an outer diameter less than the diameter of the central opening of the rear retaining member, in order to be easily inserted into the central opening of the rear retaining member.

Preferably, the front end of the rear shaft comprises a threaded outer surface cooperating by screwing with a tapped inner surface of the front end of the connecting ring. Advantageously, the rear end of the connecting ring thus comprises a larger diameter than the front end of the rear shaft, which favors retention of the connecting ring in the prison by limiting the diameter of the central opening of the rear holding member.

Preferably, the front portion of the rear shaft is abutting against the rear retaining member, in order to favor the assembly of the main shaft and the rear shaft. Preferably, the front portion of the rear shaft comprises an outer diameter greater than the diameter of the central opening of the rear retaining member, to allow the abutment.

Preferably, the front portion of the rear shaft comprises a power transmission member cooperating with the power transmission member of the rear portion of the main shaft, preferably in the form of splines formed on the inner surface of the front portion of the rear shaft. This favors the assembly of the main shaft and the rear shaft.

According to a preferred aspect, the drive line further comprises a front shaft and a connecting member integrally connecting the main shaft and the front shaft, said front shaft extending longitudinally from front to rear along the axis and in the form of a hollow part, said front shaft comprising a rear portion interlocked in a front portion of said main shaft.

Preferably, the connecting member is mounted in an inner cavity of the front shaft to cooperate by screwing with the connecting ring. Such a connecting member does not advantageously generate any external encumbrance and may be removed through the front of the front shaft to allow a tool to access the connecting ring without having to disassemble the front shaft from the drive line. In other words, the connecting member comprises an outer diameter less than the inner diameter of the inner cavity of the front shaft.

According to one aspect of the invention, the connecting member comprises:
  a rear end extending into the central opening of the front retaining member and cooperating by screwing with a front end of the connecting ring and
  a gripping member accessible from a front portion of the front shaft by a tool, to allow driving the connecting member in rotation around the longitudinal axis to screw it to the connecting ring, in order to integrally connect the front shaft to the main shaft.

Preferably, the connecting member has the form of a non-structural part, namely not transmitting the forces exerted between the connecting ring and the front shaft. Preferably, the connecting ring has the form of a structural part, namely transmitting the forces exerted between the main shaft and the rear shaft, in particular in traction and shear. Preferably, the connecting member comprises steel, in particular, is made of steel. Preferably, the connecting ring comprises steel, in particular, is made of steel.

Preferably, the rear end of the connecting member comprises a threaded outer surface cooperating by screwing with a tapped inner surface of the front end of the connecting ring. Advantageously, the front end of the connecting ring thus comprises a larger diameter than the rear end of the connecting member, which favors retention of the connecting ring in the prison by limiting the diameter of the central opening of the front retaining member.

Preferably, the gripping member is formed on the inner surface of the connecting member to be accessible by tools with a restricted diameter. Preferably, the gripping member comprises a plurality of splines allowing the tooling to screw the gripping member without relative rotation between the connecting member and the tooling.

According to one aspect of the invention, the connecting member comprises a front end extending in abutment against a rear end of the rear portion of the front shaft, in order to attach the front shaft with the connecting ring.

Preferably, the rear end of the front shaft has the form of an inner radially protruding portion to provide the abutment. Preferably, the front end of the connecting member comprises an outer radially protruding portion to provide the abutment.

According to a preferred aspect, the drive line further comprises a locking member configured to hold the connecting member fixed with respect to the front shaft, in order to secure the assembly. Preferably, the locking member is configured to cooperate with the front end of the connecting member and with the inner surface of the front shaft.

The invention also relates to an aircraft turbine engine comprising a drive line such as described previously. Preferably, the turbine engine extends longitudinally along the axis and is configured to allow propulsion of the aircraft from the acceleration of a flow of air circulating from upstream to downstream in the turbine engine, the longitudinal axis being oriented from upstream to downstream. A main shaft oriented from upstream to downstream advantageously allow access to the connecting ring from upstream of the turbine engine, in particular by removing the cone of the fan of the turbine engine.

According to one aspect, the main shaft has the form of a compressor shaft configured to be connected to a compressor of the turbine engine preferably to a low-pressure compressor of the turbine engine. For such a compressor shaft, located far from the upstream end of the turbine engine and having reduced access, the connecting ring accessible from the upstream side and captively mounted is particularly advantageous.

In one aspect, the rear shaft has the form of a turbine shaft configured to be connected to a turbine of the turbine engine extending downstream of the compressor, the compressor shaft being configured to be integrally connected to the turbine shaft so that the rotation of the turbine generated by the air flow drives the compressor in rotation. Preferably, the turbine shaft is configured to be connected to a low-pressure turbine of the turbine engine.

In one aspect, the front shaft has the form of a reduction gearbox shaft configured to be connected to a reduction gearbox of the turbine engine, the turbine engine comprising an air inlet comprising a fan extending upstream of the compressor, said reduction gearbox being connected to the fan and configured to reduce the rotation speed transmitted by the turbine to the fan, the compressor shaft being configured to be integrally connected to the reduction gearbox shaft so that the rotation of the compressor drives the fan in rotation.

Preferably, the reduction gearbox shaft comprises a reduced diameter, namely an inner diameter at least locally less than 60 mm. Such a reduction gearbox shaft is suitable for a turbine engine comprising a variable pitch fan and/or an unenclosed fan. Preferably, the aircraft turbine engine has the form of a turbojet, preferably a bypass turbojet comprising a radially inner primary duct and a radially outer secondary duct.

Preferably, the front shaft comprises steel, in particular, is made of steel. Preferably, the front shaft is convolute to favor the alignment of the drive line. According to another preferred aspect, the front shaft comprises at least one circumferential flexible element, preferably in the form of a bellows.

According to one aspect, the drive line has the form of an aircraft turbine engine low-pressure drive line configured to extend coaxially and radially inwards to a high-pressure drive line of the turbine engine. Preferably, the high-pressure drive line is configured to connect a high-pressure compressor and a high-pressure turbine of the turbine engine. Such a low-pressure drive line has restricted access and volume due to the presence of the high-pressure drive line.

The invention relates in particular to a drive line as described previously, in the form of an aircraft turbine engine low-pressure drive line configured to extend coaxially and radially inwards to a turbine engine high-pressure drive line of the turbine engine, said turbine engine extending longitudinally along the axis and being configured to enable propulsion of the aircraft from the acceleration of a flow of air circulating from upstream to downstream in the turbine engine, the longitudinal axis being oriented from upstream to downstream, the main shaft having the form of a compressor shaft configured to be connected to a low-pressure compressor of the aircraft turbine engine.

The invention also relates to a method for disassembling an aircraft turbine engine drive line as described previously, comprising:
  a step of unscrewing the rear end of the connecting ring using a tool inserted by the front portion of the main shaft, extending via the central opening of the front retaining member and cooperating with the gripping member of the connecting ring in order to drive the connecting ring in rotation about the longitudinal axis, so as to detach the connecting ring and the rear shaft, the connecting ring remaining captive in the prison, and
  a step of extracting the front portion of the rear shaft from the rear portion of the main shaft, so that the main shaft and the rear shaft are detached.

Such a disassembling method makes it easy to detach the rear shaft from the main shaft, by unscrewing the connecting ring with a tool inserted through the front portion of the main shaft. The rear shaft may thus be disassembled with reduced access and without disassembling the shaft(s) in front of it. Such a method makes it possible to save a substantial amount of time.

Preferably, the connecting ring is initially in the connecting position, wherein the rear end of the connecting ring extends abutting against the rear retaining member and cooperates by screwing with the front end of the front portion of the rear shaft, in order to integrally connect the main shaft to the rear shaft.

Preferably, at the end of the unscrewing step, the connecting ring is in the stand-by position, wherein the rear end of the connecting ring extends freely away from the rear retaining member.

Preferably, the front retaining member is initially in the rear position, wherein it holds the connecting ring fixed in the connecting position with respect to the main shaft, and the disassembling method comprises, before the unscrewing step, a step of releasing the connecting ring by moving the front retaining member.

Preferably, the disassembling method comprises, after the unscrewing step, a step of securing the connecting ring in the stand-by position by means of the front retaining member in the front position, wherein it holds the connecting ring fixed in relation to the main shaft.

Preferably, the method comprises a step of extracting the connecting member. Such a disassembling method allows the rear shaft to be detached by keeping the front shaft and the main shaft interlocked, by extracting the connecting member.

Preferably, the extraction step is implemented by moving the connecting member in the inner cavity of the front shaft to the front portion of the front shaft.

Preferably, the method comprises, before the extraction step, a step of unscrewing the rear end of the connecting member by means of a tool inserted by the front portion of the front shaft and cooperating with the gripping member of the connecting member in order to drive the connecting member in rotation about the longitudinal axis, so as to detach the connecting member and the connecting ring.

Preferably, the method further comprises, before the step of unscrewing, a step of releasing the connecting member by extracting the locking member, preferably by moving the locking member in the inner cavity of the front shaft to the front portion of the front shaft.

The invention also relates to a method for assembling the aircraft turbine engine drive line wherein the connecting ring extends captive in the prison of the main shaft, said method comprising:
  a step of inserting the front portion of the rear shaft into the rear portion of the main shaft by interlocking, so as to attach the main shaft and the rear shaft and
  a step of screwing the rear end of the connecting ring with the front end of the rear shaft, using a tool inserted by the front portion of the main shaft, extending via the central opening of the front retaining member and cooperating with the gripping member of the connecting ring to drive the connecting ring in rotation about the longitudinal axis, in order to attach the connecting ring and the rear shaft.

Preferably, the connecting ring is initially in the stand-by position wherein the rear end of the connecting ring extends freely away from the rear retaining member.

Preferably, at the end of the screwing step, the connecting ring is in the connecting position, wherein the rear end of the connecting ring extends abutting against the rear retaining member and cooperates by screwing with the front end of the front portion of the rear shaft, in order to integrally connect the main shaft to the rear shaft.

Preferably, the front retaining member is initially in the front position, wherein it holds the connecting ring fixed in the stand-by position with respect to the main shaft, and the assembling method comprises, before the screwing step, a step of releasing the connecting ring with respect to the front retaining member.

Preferably, the assembling method comprises, after the screwing step, a step of securing the connecting ring in the connecting position by means of the front retaining member moved to the rear position, wherein it holds the connecting ring fixed in relation to the main shaft.

Preferably, said method comprises a step of inserting the connecting member. Preferably, the insertion step is implemented by moving the connecting member in the inner cavity of the front shaft from the front portion of the front shaft.

Preferably, the assembling method comprises, after the insertion step, a step of screwing the rear end of the connecting member to the front end of the connecting ring by means of a tool inserted by the front portion of the front shaft and cooperating with the gripping member of the connecting member in order to drive the connecting member in rotation about the longitudinal axis, so as to attach the connecting member and the connecting ring.

Preferably, the assembling method comprises, after the screwing step, a step of securing the connecting member by means of the locking member, preferably inserted into the inner cavity of the front shaft from the front portion of the front shaft.

The invention further relates to the method of assembling a main shaft as described previously wherein the connecting ring and then the front retaining member are inserted from the front portion of the main shaft into the inner cavity, so as to define a prison wherein the connecting ring extends captively.

BRIEF DESCRIPTION OF THE DRAWINGS

The invention will be better understood upon reading the following description, given as an example, and by referring to the following figures, given as non-limiting examples, wherein identical references are given to similar objects:

FIG. 5 and

It should be noted that the figures set out the invention in detail in order to implement the invention, said figures may of course be used to better define the invention if necessary.

DETAILED DESCRIPTION

Figure 4:
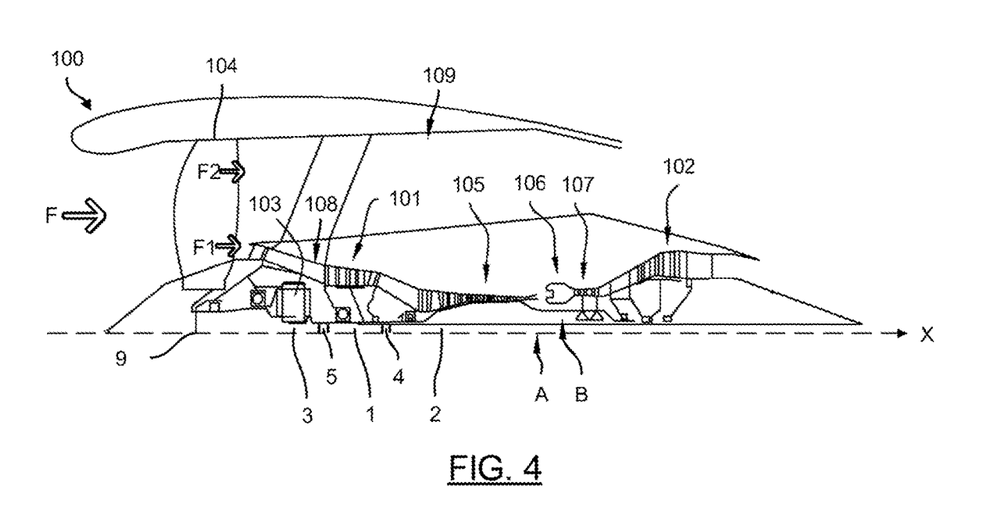
FIG. 4 is a schematic representation in a longitudinal half-section of an aircraft bypass turbine engine with a low-pressure drive line according to one embodiment of the invention.

In reference to FIG. 4, an aircraft bypass turbojet 100 is shown extending longitudinally along an axis X oriented from upstream to downstream and configured to allow propulsion of the aircraft from the acceleration of an air stream F circulating from upstream to downstream in the turbojet 100. Subsequently, the terms "upstream" and "downstream" are defined with respect to the orientation of the longitudinal axis X. The terms "inside" and "outside" in turn are defined along the radial direction with respect to the longitudinal axis X.

Still in reference to FIG. 4 and as described in the preamble, the aircraft bypass turbojet 100 comprises a radially inner primary duct 108 and a radially outer secondary duct 109 wherein respectively circulate a first part and a second part of the air flow F, known as the primary air flow F1 and the secondary air flow F2. Furthermore, the turbojet 100 comprises from upstream to downstream, an air inlet comprising a fan 104 for accelerating the air flow F, low-pressure 101 and high-pressure 105 compressors for accelerating the primary air flow F1, a combustion chamber 106 of gas with the primary air flow F1, and high-pressure 107 and low-pressure 102 turbines. The high-pressure turbine 107 makes it possible to drive the high-pressure compressor 105 in rotation while the low-pressure turbine 102 makes it possible to drive the low-pressure compressor 101 in rotation and the fan 104. In this example, the turbojet 100 further comprises a reduction gearbox 103 connected to the fan 104 and configured to reduce the rotation speed transmitted by the low-pressure turbine 102 to the fan 104. It goes without saying that the invention also applies to a turbojet without a reduction gearbox 103.

Still in reference to FIG. 4 and as described in the preamble, the turbojet 100 comprises a low-pressure drive line A connecting the reduction gearbox 103, the low-pressure compressor 101 and the low-pressure turbine 102 as well as a high-pressure drive line B connecting the high-pressure compressor 105 and the high-pressure turbine 107. In this example, the low-pressure drive lines An and high-pressure drive lines B extend coaxially along the longitudinal axis X. The low-pressure drive line A extending radially inwards to the high-pressure drive line B. It goes without saying that the number of drive lines could be different. The same applies to their relative positioning.

As shown in FIG. 4 and described in the preamble, the low-pressure drive line A comprises from upstream to downstream a reduction gearbox shaft 3, a compressor shaft 1 and a turbine shaft 2, having the form of hollow coaxial parts of longitudinal axis X and on which the reduction gearbox 103, the low-pressure compressor 101 and the low-pressure turbine 102 are mounted respectively.

According to the invention and still in reference to FIG. 4, the low-pressure drive line A further comprises a connecting ring 4 (FIG. 7) integrally connecting the compressor shaft 1 and the turbine shaft 2, and preferably, a connecting member 5 (FIG. 8) integrally connecting the compressor shaft 1 and the reduction gearbox shaft 3, as presented below.

The invention will be presented for connecting a compressor shaft 1 and a turbine shaft 2 and connecting a compressor shaft 1 and a reduction gearbox shaft 3, but it goes without saying that the shafts could be of different natures.

Figure 5:
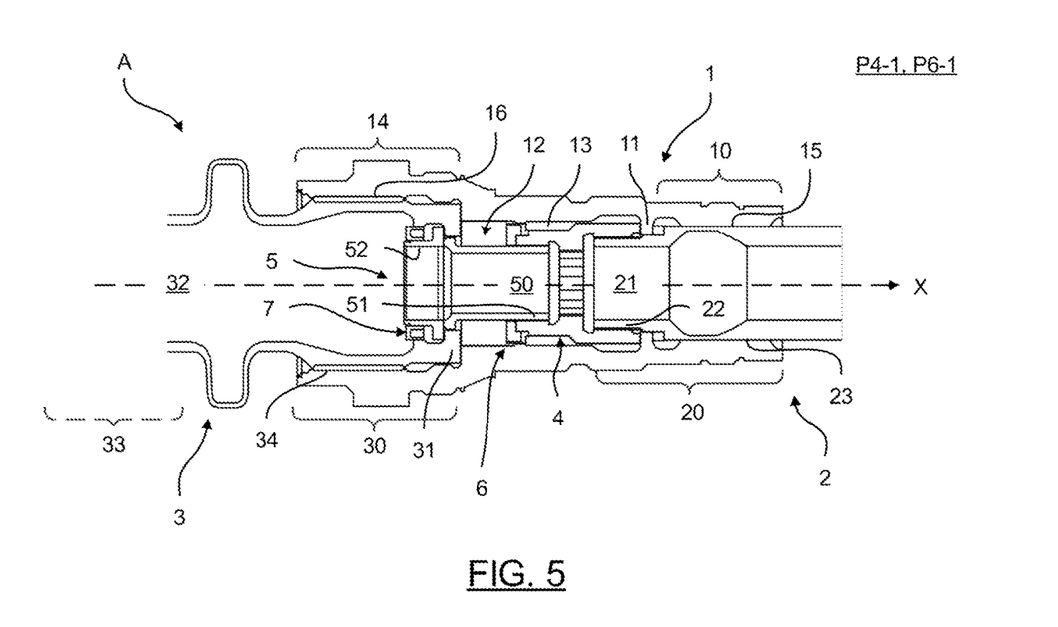
Figure 6:
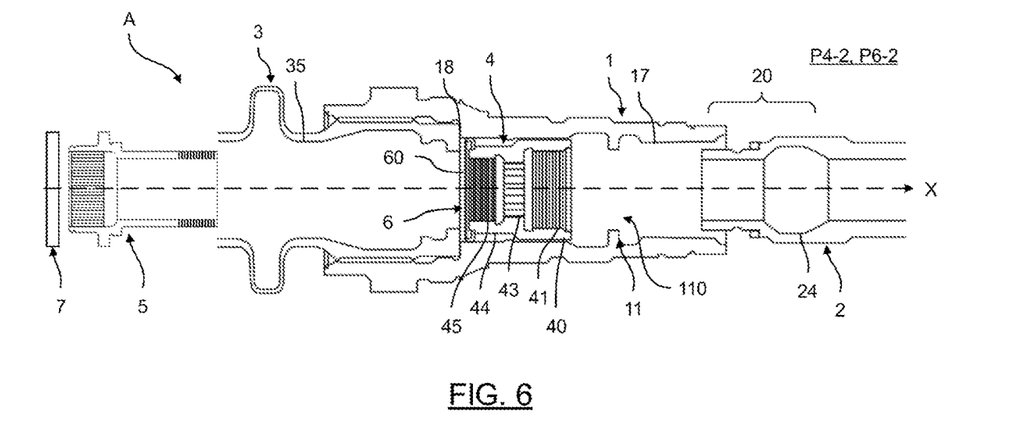
FIG. 6 shows two schematic representations in longitudinal section of the low-pressure drive line of FIG. 4 respectively assembled and disassembled according to one embodiment of the invention.

In the example of FIG. 5 and FIG. 6, the compressor shaft 1 has the form of a hollow part of a longitudinal axis X comprising an inner surface 17 defining an inner cavity 12, wherein a front retaining member 6, a connecting ring 4 and a rear retaining member 11 are mounted between a front portion 14 and a rear portion 10.

As shown in FIG. 5 and FIG. 6, the front portion 14 and the rear portion 10 are configured to receive by interlocking respectively a rear portion 30 of the reduction gearbox shaft 3 and a front portion 20 of the turbine shaft 2. The front portion 14 and the rear portion 10 of the compressor shaft 1 each comprise an abutment element to axially limit the interlocking. In this example, in reference to FIG. 6, the abutment element of the front portion 14 has the form of a shrinkage 18 of the diameter of the inner surface 17. The rear portion abutment element 10 has the form of the rear retaining member 11.

The front portion 14 and the rear portion 10 of the compressor shaft 1 each comprise a power transmission member 15, 16 configured to cooperate with power transmission members 34, 23 of the reducer shaft 3 and the turbine shaft 2 to enable transmission of torque from the turbine shaft 2 to the compressor shaft 1 and then to the reduction gearbox shaft 3. Preferably, the power transmission members 16, 15, 34, 23 are in the form of splines formed on the inner surface 17, 35, 24 of the compressor shaft 1, the reduction gearbox shaft 3 and the turbine shaft 2. The shafts 1, 2, 3 are thus coupled in rotation.

As shall now be presented, the connecting ring 4 allows the compressor shaft 1 and the turbine shaft 2 to be made integral axially, while the connecting member 5 allows the compressor shaft 1 and the reduction gearbox shaft 3 to be made integral axially.

Still in the example of FIG. 5 and FIG. 6, the front retaining member 6 and the rear retaining member 11 together define a prison 13 in the inner cavity 12 wherein the connecting ring 4 is mounted captive in order to limit its axial displacement. The connecting ring 4 is movable between a connecting position P4-1 with the turbine shaft 2 and a stand-by position P4-2 which will be presented later. The use of a prison 13 advantageously makes it possible to maintain a sufficiently large diameter of the connecting ring 4 to allow an axial connection while having a reduction gearbox shaft 3 with a reduced inner diameter.

In the example of FIG. 5 and FIG. 6, the rear retaining member 11 is made of material from the compressor shaft 1 and has the form of an inner radially protruding portion of the inner surface 17. The rear retaining member 11 is configured to form a double abutment element, upstream for the connecting ring 4 and downstream for the turbine shaft 2. The rear retaining member 11 comprises a central opening 110 to allow a front end 21 of the front portion 20 of the turbine shaft 2 to pass so as to be able to attach the connecting ring 4 and the turbine shaft 2 on either side of the rear retaining member 11. In practice, the central opening 110 of the rear retaining member 11 comprises a diameter less than the outer diameter of the connecting ring 4 to retain it in the prison 13. Conversely, the central opening 110 of the rear retaining member 11 comprises a diameter greater than the outer diameter of the front end 21 of the turbine shaft 2 to allow it to pass through.

Thus, the connecting ring 4 strictly extends between the front retaining member 6 and the rear retaining member 11. In addition, the rear end of the connecting ring 4 comprises a diameter greater than that of the rear retaining member 11. Likewise, the front end of the connecting ring 4 comprises a diameter greater than that of the front retaining member 6.

In the example in FIG. 5 and FIG. 6, the front retaining member 6 is mounted relative to the inner cavity 12 of the compressor shaft 1 in order to be able to access the connecting ring 4.

According to a preferred aspect, the front retaining member 6 is movably mounted in the inner cavity 12 between a rear position P6-1 shown in FIG. 5, wherein it holds the connecting ring 4 in the connecting position P4-1 with respect to the compressor shaft 1, and a front position P6-2 shown in FIG. 6, wherein it holds the connecting ring 4 fixed in the stand-by position P4-2 with respect to the compressor shaft 1.

The front retaining member 6 is configured to cooperate with the connecting ring 4 and with the inner surface 17 of the compressor shaft 1 in order to keep the connecting ring 4 fixed in relation to the compressor shaft 1. More precisely, the front retaining member 6 in the rear position P6-1 locks the connecting ring 4 in the connecting position P4-1 to prevent any unintentional unscrewing. The front retaining member 6 in the front position P6-2 locks the connecting ring 4 in the stand-by position P4-2 to prevent any movement in the prison 13. The front retaining member 6 preferably comprises a rotational locking element, such as a holding brake, and an axial locking element, such as a circlip. The front retaining member 6 further comprises a central opening 60 to allow tools to pass through for handling the connecting ring 4. The central opening 60 further allows one rear end 50 of the connecting member 5 to pass through in order to enable it to cooperate with the connecting ring 4. In practice, the diameter of the central opening 60 is less than the outer diameter of the connecting ring 4 to retain it.

In reference to FIG. 5 and FIG. 6, the connecting ring 4 is located in the prison 13 of the compressor shaft 1 and is configured to integrally attach it, on the one hand, to the turbine shaft 2 and, on the other hand, in cooperation with the connecting member 5, to the reduction gearbox shaft 3. More precisely, in the connecting position P4-1 (FIG. 5), the connecting ring 4 cooperates with the turbine shaft 2, abutting against the rear retaining member 11 and secured by the front retaining member 6. In stand-by position P4-2

(FIG. 6), the connecting ring 4 is held fixed in the prison 13 by the front retaining member 6.

Preferably, the connecting ring 4 has the form of a structural part, allowing the compressor shaft 1 to take up the loads of the turbine shaft 2.

Figure 7:
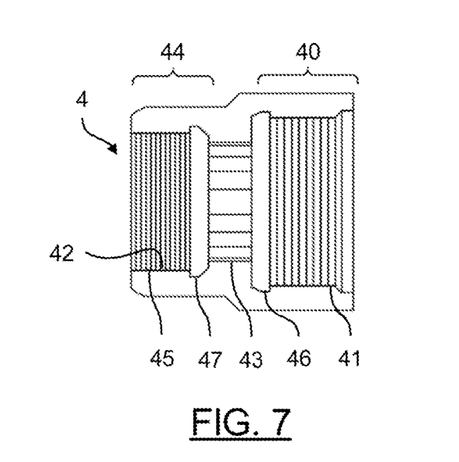
FIG. 7 is a schematic representation of the connecting ring of the low-pressure drive line of FIG. 5.

In reference to FIG. 7, the connecting ring 4 has the form of a hollow part comprising an inner surface 42, a front end 44 configured to cooperate by screwing with the connecting member 5, and a rear end 40 configured to cooperate with the turbine shaft 2. The front end 44 is further configured to cooperate with the front retaining member 6 while the rear end 40 is configured to abut against the rear retaining member 11. More precisely, the front end 44 and the rear end 40 each comprise an inner tapped surface 45, 41 which are configured respectively to cooperate with threaded outer surfaces 22, 51 of the turbine shaft 2 and the connecting member 5.

A gripping member 43 is formed on the inner surface 42 between the front end 44 and the rear end 40, separated from the tapped inner surfaces 45, 41 by a front separating member 47 and a rear separating member 46. Still in reference to FIG. 7, the gripping member 43 is configured to cooperate with a tool in order to drive the connecting ring 4 in rotation and allow its cooperation with the turbine shaft 2. In the example of FIG. 7, the gripping member 43 has the form of splines formed on the inner surface 42 allowing good cooperation with the tooling, and more particularly to allow the tooling to transmit a rotation torque to the connecting ring 4 to allow the screwing thereof. In this example, the gripping member 43 comprises an inner diameter smaller than that of the front end 44 and the rear end 40, allowing cooperation with a tool of reduced diameter, easily inserted into the low-pressure drive line A.

In the example of FIG. 7, the front separating member 47 and the rear separating member 46 are in the form of a transverse annular notch, making it possible respectively to axially limit the screwing to the connecting member 5 and to the turbine shaft 2.

A tapping of the front end 44 and the rear end 40 is preferred to a threading in order to avoid a substantial radial clearance of the connecting ring 4 in the prison 13.

In the connecting position P4-1, as shown in FIG. 5, the rear end 40 of the connecting ring 4 is abutting against the rear retaining member 11 and cooperates by screwing with the front end 21 of the front portion 20 of the turbine shaft 2 in order to axially integrally connect the compressor shaft 1 to the turbine shaft 2. In the stand-by position P4-2, as shown in FIG. 6, the rear end 40 of the connecting ring 4 extends freely away from the rear retaining member 11, in order to be able to detach the turbine shaft 2.

In summary, according to the invention, a connecting ring 4 mounted captive in the inner cavity 12 of a compressor shaft 1 is provided and the rear end 40 of which cooperates by screwing with a front end 21 of a turbine shaft 2 in order to attach them. A rear retaining member 11 retains the connecting ring 4 captive downstream while allowing the front end 21 of the turbine shaft 2 to pass through to allow for attachment. A front retaining member 6 retains the connecting ring 4 captive upstream and prevents the unscrewing thereof. The front retaining member 6 also holds the connecting ring 4 fixed when the turbine shaft 2 is detached.

As previously described, a connecting member 5 is also provided that connects the compressor shaft 1 and the reduction gearbox shaft 3. A locking member 7 is configured to hold the connecting member 5 in place with respect to the reduction gearbox shaft 3, in order to secure the cooperation of the connecting member 5 and the connecting ring 4.

In reference to FIG. 5 and FIG. 6, the connecting member 5 and the locking member 7 are mounted in the inner cavity 32 of the reduction gearbox shaft 3, inserted by a front portion 33 of the reduction gearbox shaft 3. The connecting member 5 cooperates with the connecting ring 4 to integrally attach the reduction gearbox shaft 3 to the compressor shaft 1. The locking member 7 cooperates with the inner surface 35 of the reduction gearbox shaft 3 and with the connecting member 5 to secure the integral attachment. Preferably, the locking member 7 comprises, in a similar manner to the front retaining member 6, a rotational locking element, such as a holding brake, and an axial locking member, such as a circlip, for optimal securing.

Figure 8:
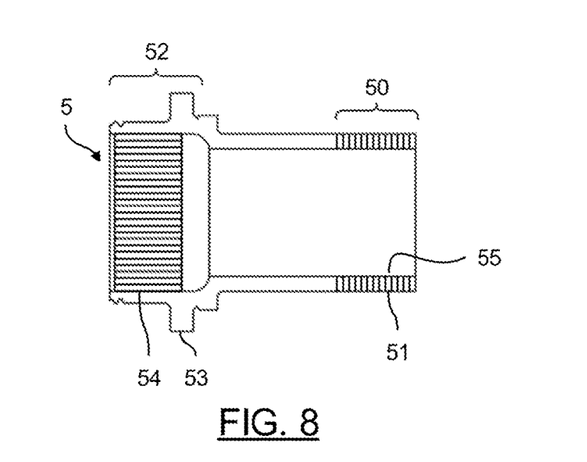
FIG. 8 is a schematic representation of the connecting member of the low-pressure drive line of FIG. 5.

In reference to FIG. 8, the connecting member 5 has the form of a hollow part comprising an inner surface 55, a front end 52 configured to cooperate with the reduction gearbox shaft 3 and a rear end 50 configured to cooperate with the connecting ring 4. More precisely, the rear end 50 is configured to extend into the central opening 60 of the front retaining member 6 and comprises an outer threaded surface 51 configured to cooperate by screwing with the inner tapped surface 45 of the connecting ring 4.

Still in reference to FIG. 8, the front end 52 comprises an outer radial protrusion portion 53 and a gripping member 54 formed on the inner surface 55 of the connecting member 5. The outer radial protruding portion 53 is configured to extend abutting against a rear end 31 of the rear portion 30 of the reduction gearbox shaft 3, in order to integrally attach the reduction gearbox shaft 3 to the connecting ring 4. For an optimum abutment, the rear end 31 of the reduction gearbox shaft 3 has the form of an internal protruding edge. The gripping member 54 is configured to cooperate with a tool in order to drive the connecting member 5 in rotation and allow its cooperation with the connecting ring 4. In the example in FIG. 8, the gripping member 54 has the form of splines formed on the inner surface 55 allowing good cooperation with the tooling to transmit a screwing torque.

Preferably, the connecting member 5 has the form of a flexible part, i.e. non-structural, which makes very little effort pass through. The diameter of the connecting member 5 is chosen according to that of the reduction gearbox shaft 3 and is less than the inner diameter of said reduction gearbox shaft 3 in order to allow the insertion and extraction thereof. The non-structural nature of the connecting member 5 advantageously allows its diameter to be limited.

In other words, it is provided according to a preferred aspect of the invention that the connecting ring 4 cooperate by screwing on the one hand with the turbine shaft 2, at its rear end and on the other hand with a connecting member 5, at its front end 44. The connecting ring 4 thus makes it possible to integrally attach the compressor shaft 1 and the turbine shaft 2 and cooperates with the connecting member 5 to integrally attach the compressor shaft 1 and the reducer shaft 3.

Thanks to the invention, the compressor shaft 1 and the turbine shaft 2 of a low-pressure drive line A are reliably and securely attached. In addition, they may be separated easily and conveniently via the connecting ring 4, which is mounted captive in the compressor shaft 1. The gripping member 43 of the connecting ring 4 allows a tool to handle it at a distance from upstream to screw it and unscrew it from the turbine shaft 2. In particular, in the presence of a reducer shaft 3, the connecting ring 4 makes it possible to detach the turbine shaft 2 without disassembling the upstream shafts, i.e. the compressor shaft 1 and the reduction gearbox shaft 3. A captive connecting ring 4 allows the latter to have a substantial diameter, in particular greater than that of the inner diameter of the reduction gearbox shaft 3, to take up the loads of the turbine shaft 2. It is only necessary to extract the connecting member 5 via the upstream side of the fan low-pressure drive line A, in practice via the one of the fan 104. This saves time, in particular when servicing the low-pressure turbine 102.

The invention is particularly suitable for a reduction gearbox shaft 3 with a reduced diameter, namely the inner diameter of which is at least locally less than 60 mm. Such a reduction gearbox shaft 3 is provided, in particular, in the presence of a variable-pitch fan 104 or an unenclosed fan 104, which comprise a substantial diameter requiring reduction of that of the reduction gearbox shaft 3. Preferably, the reduction gearbox shaft 3 comprises steel. Preferably, the front shaft is convolute to favor the alignment of the drive line A. Alternatively, the reduction gearbox shaft 3 comprises at least one circumferential flexible element, preferably in the form of a bellows.

Furthermore, it goes without saying that the invention is not limited to connecting a compressor shaft 1 with a turbine shaft 2 and a reduction gearbox shaft 3 of a low-pressure drive line A of an aircraft bypass turbojet 100, as presented previously. The invention in fact encompasses the connecting of any main shaft 1 with a rear shaft 2 of any aircraft turbine engine 100 drive line A. The invention in particular encompasses connecting any main shaft 1 on the one hand with a rear shaft 2 and on the other hand with a front shaft 3 of any aircraft turbine engine 100 drive line A. It should be noted that the terms "front" and "rear" referring here to the upstream and downstream of the aircraft turbine engine 100 could be reversed. The preceding and the following description are here adaptable to another embodiment by replacing the terms: "compressor shaft 1", "turbine shaft 2", "reduction gearbox shaft 3", "upstream", "downstream", low-pressure drive line A" and "aircraft bypass turbojet 100" respectively with: "main shaft 1", "rear shaft 2", "front shaft 3", "front", rear", "drive line A" and "aircraft turbine engine 100".

A method is described below for disassembling the low-pressure drive line A previously presented, which allows the turbine shaft 2 to be detached from the compressor shaft 1, while keeping the reduction gearbox shaft 3 and the compressor shaft 1 interlocked. Such a disassembling method is for example implemented during a maintenance step of the low-pressure turbine 102.

Figure 9:
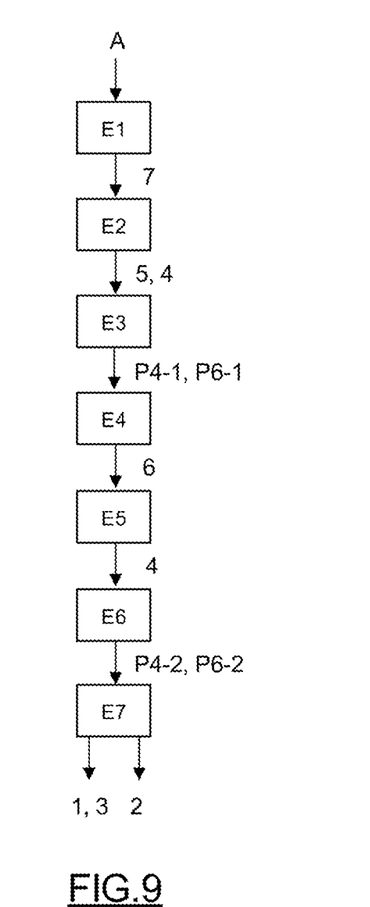
FIG. 9 is a schematic representation of the steps of the disassembling method of the low-pressure drive line of FIG. 5.

In reference to FIG. 9, the method of disassembling the low-pressure drive line A aims firstly to remove the connecting member 5, via a release step E1, an unscrewing step E2 and an extraction step E3, and secondly to detach the connecting ring 4, via a release step E4, an unscrewing step E5 and a securing step E6, in order to be able to remove the turbine shaft 2 during an extraction step E7.

Figure 11:
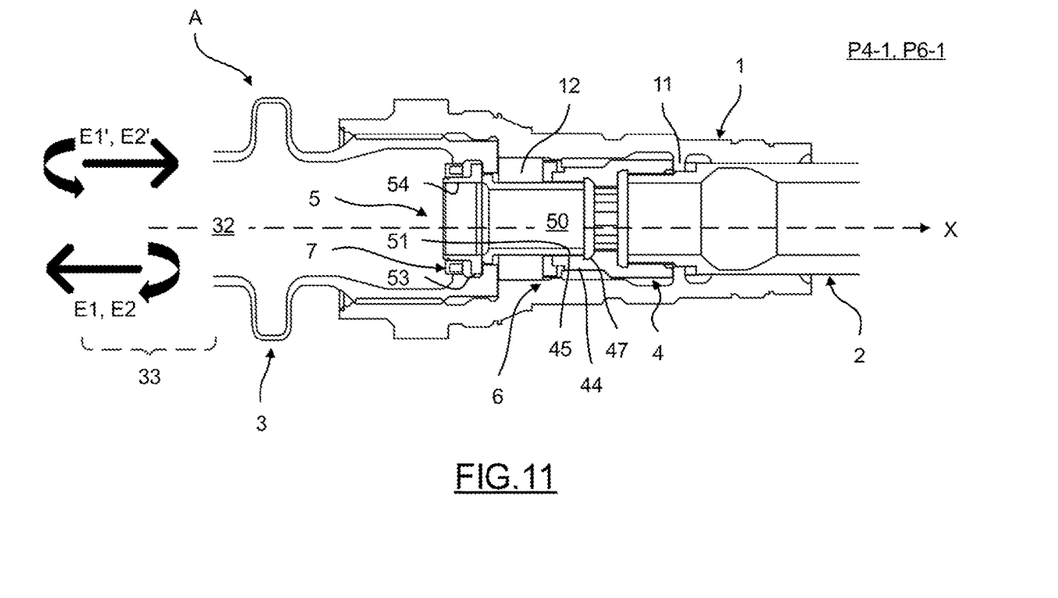
FIG. 11 is a schematic representation of the step of releasing/locking the connecting member and the step of unscrewing/screwing the connecting member according to the disassembling/assembling method of FIG. 9/FIG. 10.

As shown in FIG. 11, the reduction gearbox shaft 3, the compressor shaft 1 and the turbine shaft 2 are initially integrally connected, so that the driving in rotation of the turbine shaft 2 drives the compressor shaft 1 and the reduction gearbox shaft 3 in rotation. In other words, the connecting ring 4 is initially in the connecting position P4-1 and the front retaining member 6 in the rear position P6-1, which ensures the axial attaching of the compressor shaft 1 and the turbine shaft 2. In addition, the connecting member 5 cooperates with the connecting ring 4 and the locking member 7 to ensure that the compressor shaft 1 and the reduction gear shaft 3 are integrally attached.

Before implementing the disassembling method, the cone of the fan 104 is disassembled so that the front portion 33 of the reduction gearbox shaft 3 is accessible.

Still in reference to FIG. 11, during the release step E1, a tool is inserted by the front portion 33 of the reduction gearbox shaft 3, in order to detach the locking member 7 and remove it from the front. The connecting member 5 at the end of the release step E1 is thus no longer held fixed by the locking member 7.

Still in reference to FIG. 11, during the unscrewing step E2, a tool is inserted again by the front portion 33 of the reduction gearbox shaft 3, in order to cooperate with the gripping member 54 of the connecting member 5. The rotation of the tool allows the driving in rotation of the connecting member 5 and thus the unscrewing of its rear end 50. At the end of the unscrewing step E2, the rear end 50 of the connecting member 5 no longer cooperates with the front end 44 of the connecting ring 4. After unscrewing, the reduction gearbox shaft 3 is no longer axially locked with respect to the compressor shaft 2.

Figure 12:
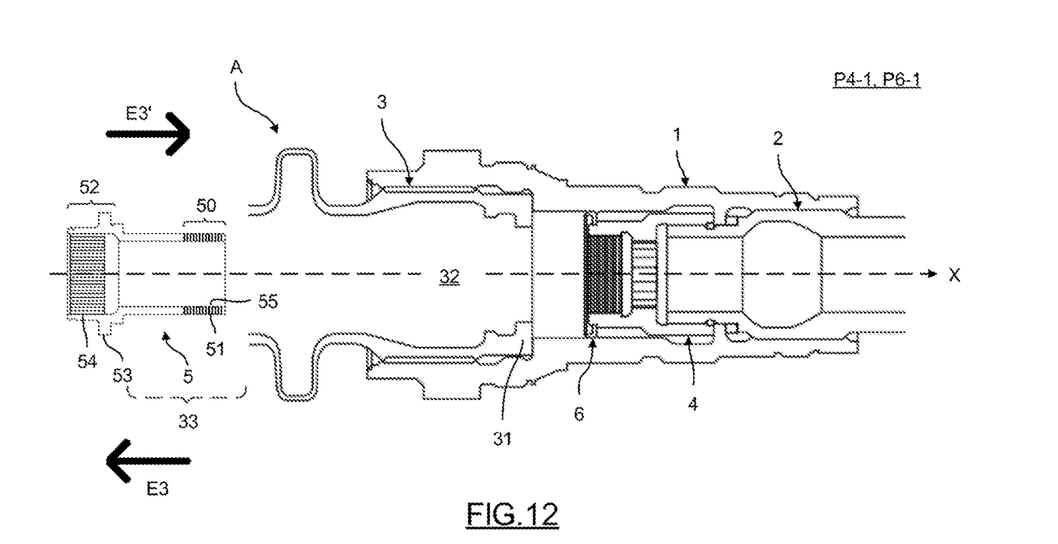
FIG. 12 is a schematic representation of the step of extracting/inserting the connecting member according to the disassembling/assembling method in FIG. 9/FIG. 10.

In reference to FIG. 12, the extraction step E3 of the connecting member 5 is implemented by moving it in the inner cavity 32 to the front portion 33 of the reduction gearbox shaft 3. At the end of extraction step E3, the connecting ring 4, and in particular the gripping member 43, is accessible from upstream of the low-pressure drive line A. In this embodiment, the reduction gearbox shaft 3 is still engaged in the compressor shaft 1 and the rest in the subsequent steps of the disassembling method.

Figure 13:
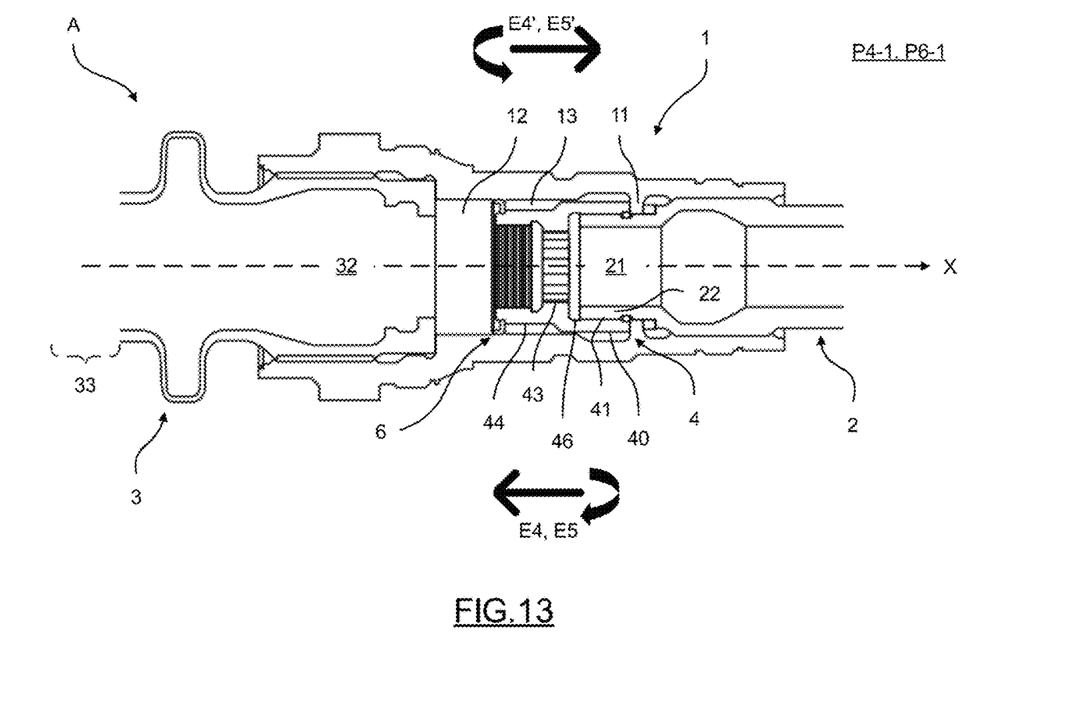
FIG. 13 is a schematic representation of the step of releasing/locking the connecting ring in the connecting position and the step of unscrewing/screwing the connecting ring according to the disassembling/assembling method in FIG. 9/FIG. 10.

In reference to FIG. 13, during the release step E4, a tool is inserted by the front portion 33 of the reduction gearbox shaft 3, in order to move the front retaining member 6 forward which prohibits any rotation of the connecting ring 4. Thus, at the end of the release step E4, the front retaining member 6 has been moved from its rear position P6-1 and no longer holds the connecting ring 4 in the connecting position P4-1 which may then be unscrewed.

Still in reference to FIG. 13, during the unscrewing step E5, a tool is inserted again by the front portion 33 of the reducer shaft 3, in order to cooperate with the gripping member 43 of the connecting ring 4, in particular, through the central opening 60 of the front retaining member 6. The rotation of the tool allows the connecting ring 4 to be driven in rotation and thus the unscrewing of its rear end 40. At the end of the unscrewing step E5, the rear end 40 of the connecting ring 4 no longer cooperates with the front end 21 of the turbine shaft 2. Thus, the axial connection between the compressor shaft 1 and the turbine shaft 1 no longer exists. When unscrewing, the connecting ring 4 moves forwards in its prison 13. It does not need to be removed completely as in the prior art. This allows a connecting ring 4 of substantial section to be maintained in order to ensure optimum axial locking.

Figure 14:
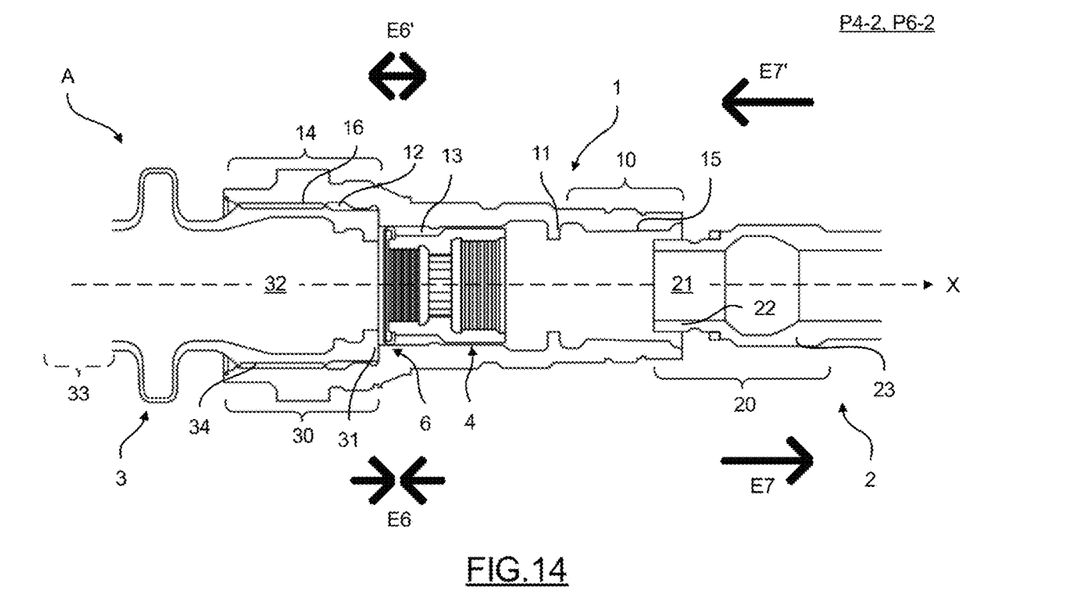
FIG. 14 is a schematic representation of the step of securing/unlocking the connecting ring in the stand-by position and the step of extracting/inserting the turbine shaft according to the disassembling/assembling method of FIG. 9/FIG. 10.

In reference to FIG. 14, a securing step E6 of the connecting ring 4 is carried out by causing the connecting ring 4 to cooperate with the front retaining member 6. At the end of the securing step E6, the connecting ring 4 is in the stand-by position P4-2 and the front retaining member 6 is in the front position P6-2. Such a securing step E6 prevents any unintentional movement of the connecting ring 4 in the prison 13.

FIG. 14 also shows the extraction of the front portion 20 of the turbine shaft 2 from the rear portion 10 of the connecting ring 4. At the end of the disassembling method, the compressor shaft 1 and the reduction gearbox shaft 3 are still interlocked.

It should be noted that the securing step E6 of the connecting ring 4 and the extraction step E7 of the turbine shaft 2 may be implemented in any order. It should also be noted that the same or different tools may be used to implement the different steps of the disassembling method. In particular, a tool may be kept inserted in the inner cavity 32 of the reduction gearbox shaft 3 between two steps to limit handling.

Such a disassembling method advantageously makes it possible to simply and conveniently detach the turbine shaft 2, without disassembling the shafts located upstream, i.e. the compressor shaft 1 and the gearbox shaft 3, which saves a considerable amount of time. In addition, the disassembling method may be implemented for a reduction gearbox shaft 3 of any diameter, and in particular of reduced diameter, thanks to the captive mounted connecting ring 4.

The invention also relates to a method for assembling the turbine shaft 2 on the low-pressure drive line A, implemented in particular after the disassembling method previously presented in order to reassemble the low-pressure drive line once maintenance has been completed.

Figure 10:
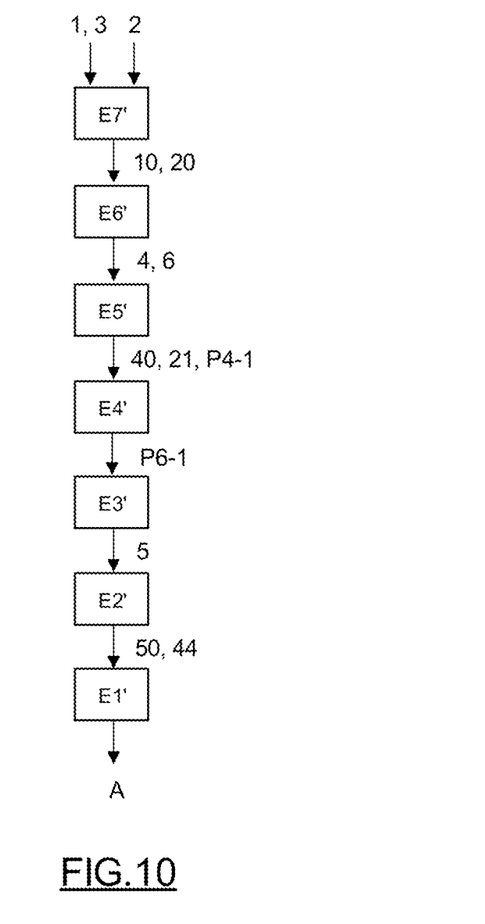
FIG. 10 is a schematic representation of the steps of the disassembling method of the low-pressure drive line of FIG. 5.

As shown in FIG. 10, the assembling method comprises the same steps as the disassembling method, which are carried out inversely and in reverse order. In other words, the assembling method aims to interlock the turbine shaft 2 in the compressor shaft 1 during an insertion step E7', then firstly, to attach the connecting ring 4, via a release step E6', a screwing step E5' and a securing step E4', and secondly, to attach the connecting member 5, via an insertion step E3', a screwing step E2' and a securing step E1'.

More precisely, in reference to FIG. 14, the compressor shaft 1 and the reduction gearbox shaft 3 are initially interlocked but not axially integral by the connecting member 5. The connecting ring 4 and the front retaining member 6 are respectively in the stand-by position P4-2 and in the front position P6-2.

Still in reference to FIG. 14, the assembling method begins by inserting via interlocking the front portion 20 of the turbine shaft 2 into the rear portion 10 of the compressor shaft 1 (insertion step E7') until the turbine shaft 2 abuts with the rear retaining member 11. During the insertion step, the splines of shafts 1, 2 cooperate together.

In this embodiment, the front retaining member 6 is detached from the connecting ring 4, by means of a tool inserted by the front portion 33 of the reduction gearbox shaft 3 (release step E6'). At the end of the release step E6', the front retaining member 6 was moved from its front position P6-2 and no longer holds the connecting ring 4 in the stand-by position P4-2. The insertion step E7' and the release step E6' may be implemented in any order.

In reference to FIG. 13, during the screwing step E5', a tool is inserted by the front portion 33 of the reduction gearbox shaft 3, in order to cooperate with the gripping member 43 of the connecting ring 4. The tool is inserted into the central opening 60 of the front retaining member 6. The rotation of the tool makes it possible to drive the connecting ring 4 in rotation and thus screw its rear end 40 to the front end 21 of the turbine shaft 2. The tightening torque is high so that the connecting ring 4 takes up the forces of the turbine shaft 2. Advantageously, the connecting ring 4 may move axially in its prison 13 to reach the front end 21 of the turbine shaft 2.

At the end of the screwing step E5', the connecting ring 4 is in the connecting position P4-1. The rear holding member 11 of the compressor shaft 1 is sandwiched between the connecting ring 4 and the turbine shaft 2, which axially attaches the compressor shaft 1 and the turbine shaft 2.

The securing step E4' is then implemented by attaching the front retaining member 6 to the connecting ring 4 in the connecting position P4-1. This prevents any unintentional loosening due to vibrations. At the end of the securing step E4', the front retaining member 6 is in the rear position P6-1.

In reference to FIG. 11 and FIG. 12, the connecting member 5 is then inserted by the front portion 33 of the reduction gearbox shaft 3 (insertion step E3') and then its rear end 50 is screwed to the front end 44 of the connecting ring 4 (screwing step E2') in order to make an axial locking of the reduction gearbox shaft 3 with respect to the compressor shaft 1, the outer radial protrusion 53 of the connecting member 5 exerting an axial pressing force directed towards the rear.

The locking member 7 is then inserted by the front portion 33 of the reduction gearbox shaft 3 and secures the screwing (securing step E1'). At the end of the securing step E1', the compressor shaft 1 and the reduction gearbox shaft 3 are integrally connected and the low-pressure drive line A is mounted.

As with the disassembling method, the same tool or different tools may be used to implement the different steps of the assembling method. In particular, a tool may be kept inserted in the inner cavity 32 of the reduction gearbox shaft 3 between two steps to limit handling.

Such an assembling method makes it easy and convenient to re-assemble the turbine shaft 2 to the low-pressure drive line A, in particular after maintenance.

The invention further relates to a method for assembling the compressor shaft 1, preliminary to its integration into the low-pressure drive line A, which consists of successively inserting into the inner cavity 12 the connecting ring 4 and the front retaining member 6, in order to define a prison 13 wherein the connecting ring 4 is mounted captive.

The invention claimed is:

1. A drive line of an aircraft turbine engine comprising a main shaft and a rear shaft integrally connected to one another,
   the drive line further comprising a front shaft and a connecting member integrally connecting the main shaft and the front shaft,
   each of the main shaft, the rear shaft, and the front shaft being hollow and extending longitudinally from front to rear along a longitudinal axis,
   said main shaft defining an open inner cavity,
   said main shaft comprising a rear portion receiving a front portion of the rear shaft by interlocking and the main shaft comprising a front portion receiving a rear portion of the front shaft by interlocking,
   said main shaft comprising:
      a front retaining member and a rear retaining member both positioned in the open inner cavity so as to define together a prison, and each of the front retaining member and the rear retaining member comprising a central opening, the front portion of the rear shaft comprising a front end extending into the central opening of the rear retaining member, and
      a connecting ring located in the prison and comprising a rear end screwed with the front end of the rear shaft and abutting against the rear retaining member, the connecting member being mounted in an inner cavity of the front shaft and cooperating with the connecting ring by screwing, said connecting ring comprising an inner surface having at least one gripping member accessible from the front portion of said main shaft by a tool extending via the central opening of the front retaining member to allow said connecting ring to be driven in rotation about the longitudinal axis to screw the connecting ring to the rear shaft so that said main shaft is integrally connected to the rear shaft.

2. The drive line according to claim 1, wherein said connecting ring is axially movably mounted in the prison between a connecting position and a stand-by position.

3. The drive line according to claim 1, wherein the rear retaining member comes from material of said main shaft.

4. The drive line according to claim 1, wherein the front retaining member is axially movably mounted in the inner cavity of said main shaft between a rear position and a front position.

5. The drive line according to claim 1, wherein the connecting member comprises:
   a rear end extending into the central opening of the front retaining member and cooperating by screwing with a front end of said connecting ring; and
   a gripping member accessible from a front portion of the front shaft by a tool, in order to allow for driving the connecting member in rotation about the longitudinal axis to screw the connecting member to said connecting ring so that the front shaft is integrally connected to said main shaft.

6. The drive line according to claim 1, wherein the connecting member comprises a front end extending so as to abut against a rear end of the rear portion of the front shaft.

7. The drive line according to claim 1 having the form of an aircraft turbine engine low-pressure drive line configured to extend coaxially and radially inward of a high-pressure drive line of the turbine engine, said turbine engine extending longitudinally along the longitudinal axis and being configured to allow propulsion an aircraft from the acceleration of an air flow circulating from upstream to downstream in the turbine engine, the longitudinal axis being oriented from upstream to downstream, and said main shaft being in the form of a compressor shaft configured to be connected to a low-pressure compressor of the aircraft turbine engine.

8. A method for disassembling an aircraft turbine engine drive line according to claim 1, comprising:
   a step of unscrewing the rear end of the connecting member so as to detach the connecting member and the connecting ring, by means of a tool inserted by a front portion of the front shaft and cooperating with the connecting member in order to drive the connecting member in rotation about the longitudinal axis,
   a step of extracting the connecting member,
   a step of unscrewing the rear end of said connecting ring by means of the tool inserted by the front portion of said main shaft, extending via the central opening of the front retaining member and cooperating with the at least one gripping member of said connecting ring in order to drive said connecting ring in rotation about the longitudinal axis, so as to detach said connecting ring and the rear shaft, said connecting ring remaining captive in the prison, and
   a step of extracting the front portion of the rear shaft from the rear portion of said main shaft in order to detach said main shaft and the rear shaft.

9. A drive line of an aircraft turbine engine comprising:
   a main shaft and a rear shaft integrally connected to one another;
   a front shaft, which has an inner cavity, connected to the main shaft by a connecting member;
   the main shaft, the rear shaft, and the front shaft extending longitudinally from front to rear along a longitudinal axis;
   said main shaft having an open inner cavity, a rear portion receiving a front portion of the rear shaft by interlocking, and
   a front portion receiving a rear portion of the front shaft by interlocking;
   said main shaft further comprising:
   a front retaining member having a central opening and a rear retaining member having a central opening and both the front retaining member and the rear retaining member being positioned in the open inner cavity and together defining a prison, wherein the front portion of the rear shaft comprising a front end extending into the central opening of the rear retaining member; and
   a connecting ring located in the prison and comprising a rear end threaded to the front end of the rear shaft and abutting against the rear retaining member,
   the connecting member being mounted in the inner cavity of the front shaft and cooperating with the connecting ring by threaded engagement,
   said connecting ring comprising an inner surface having at least one gripping member accessible from the front portion of said main shaft by a tool extending via the central opening of the retaining member to allow said connecting ring to be driven in rotation about the longitudinal axis to thread the connecting ring to the rear shaft to connect the main shaft to the rear shaft.

10. The drive line according to claim 9, wherein said connecting ring is axially movably mounted in the prison between a connecting position and a stand-by position.

11. The drive line according to claim 9, wherein the rear retaining member comes from material of said main shaft.

12. The drive line according to claim 9, wherein the front retaining member is axially movably mounted in the inner cavity of said main shaft between a rear position and a front position.

13. The drive line according to claim 9, wherein the connecting member comprises:
   a rear end extending into the central opening of the front retaining member and cooperating by screwing with a front end of said connecting ring; and
   a gripping member accessible from a front portion of the front shaft by a tool, in order to allow for driving the connecting member in rotation about the longitudinal axis to screw the connecting member to said connecting ring so that the front shaft is integrally connected to said main shaft.

14. The drive line according to claim 9, wherein the connecting member comprises a front end extending so as to abut against a rear end of the rear portion of the front shaft.

15. The drive line according to claim 9, which has the form of an aircraft turbine engine low-pressure drive line configured to extend coaxially and radially inward of a high-pressure drive line of the turbine engine,
   said turbine engine extending longitudinally along the longitudinal axis and being configured to allow propulsion of an aircraft from the acceleration of an air flow circulating from upstream to downstream in the turbine engine, the longitudinal axis being oriented from upstream to downstream, said main shaft, which is a compressor shaft, is configured to be connected to a low-pressure compressor of the aircraft turbine engine.

* * * * *